(12) United States Patent
Johnson, Jr. et al.

(10) Patent No.: US 8,116,678 B2
(45) Date of Patent: Feb. 14, 2012

(54) METHODS, SYSTEMS AND COMPUTER PROGRAM PRODUCTS FOR INTERACTING WITH ISO 14443-4 AND MIFARE® APPLICATIONS ON THE SAME WIRELESS SMART DEVICE DURING A COMMON TRANSACTION

(75) Inventors: William S. Johnson, Jr., Sunnyvale, CA (US); Pradeep Kumar, Fremont, CA (US); Ming-Li Liu, Foster City, CA (US); Xuejun Jiao, San Jose, CA (US)

(73) Assignee: Vivotech, Inc., Santa Clara, CA (US)

( * ) Notice: Subject to any disclaimer, the term of this patent is extended or adjusted under 35 U.S.C. 154(b) by 549 days.

(21) Appl. No.: 11/811,342

(22) Filed: Jun. 8, 2007

(65) Prior Publication Data
US 2008/0306849 A1  Dec. 11, 2008

(51) Int. Cl.
  *H04B 5/00*  (2006.01)
(52) U.S. Cl. ............................ 455/41.1; 235/380
(58) Field of Classification Search .............. 455/41.1; 235/380, 472.01, 472.02, 462.47; 705/35; 340/5.4
See application file for complete search history.

(56) References Cited

U.S. PATENT DOCUMENTS

| 7,832,646 | B1 * | 11/2010 | Lason | 235/492 |
| 2003/0193355 | A1 * | 10/2003 | Leifso et al. | 327/115 |
| 2006/0219776 | A1 * | 10/2006 | Finn | 235/380 |
| 2009/0102520 | A1 * | 4/2009 | Lee et al. | 327/115 |

OTHER PUBLICATIONS

Notification of Transmittal of the International Search Report and the Written Opinion of the International Searching Authority, or the Declaration for International Application No. PCT/US2008/007215 (Sep. 9, 2008).
MasterCard International, "MasterCard® PayPass™—Terminal Implementation Guide", MasterCard International Incorporated (2004).
Philips Semiconductors, "Integrated Circuits—Application Note—mifare® Interface Platform—Type Identification Procedure", Koninklijke Philips Electronics N.V., Revision 1.3 Public (Nov. 2004).
Philips Semiconductors, "Integrated Circuits—Data Sheet—mifare® ultra light—Contactless Single-trip Ticket IC MF0 IC U1—Functional Specification", Koninklijke Philips Electronics N.V., Product Specification, Revision 3.0, Public (Mar. 2003).
Philips Semiconductors, "Integrated Circuits—Data Sheet—mifare® Standard Card IC—MF1 IC S50—Functional Specification", Philips Electronics N.V., Product Specification, Revision 5.1 (May 2001).

(Continued)

*Primary Examiner* — Nay A Maung
*Assistant Examiner* — Angelica Perez
(74) *Attorney, Agent, or Firm* — Jenkins, Wilson, Taylor & Hunt, P.A.

(57) ABSTRACT

Methods, systems, and computer program products for interacting with ISO 14443-4 and MIFARE® applications on the same wireless smart device during a common transaction are disclosed. According to one aspect, the method includes detecting and communicating with an ISO 14443-4 application located on a wireless smart device that includes an ISO 14443-4 and a MIFARE® application to perform at least part of the common transaction. Termination of the ISO 14443-4 application is detected, and the MIFARE® application located on the wireless smart device is detected and communicated with for performing at least part of the common transaction.

18 Claims, 5 Drawing Sheets

OTHER PUBLICATIONS

MIFARE® Certification Institute, "Testplan for Certification of Terminals based on MIFARE®—qualified Readers—Single and Double UID", Arsenal Research, Testplan Terminals upgrade short version, Version 2.3 (publication date unknown).

OTI, "ISO 14443—An Introduction to the contactless standard for smart cards and its relevance to customers," OTI On Track Innovations Ltd. (publication date unknown).

Wikipedia, "Smart Card," http://en.wikipedia.org/wiki/Smartcard, pp. 1-8 (Downloaded from the Internet on Jul. 11, 2006).

"Understanding the Requirements of ISO/IEC 14443 for Type B Proximity Contactless Identification Cards," Atmel® Rev. 2056B-RFID-11/05, pp. 1-28 (Nov. 2005).

EMVCo, "Application Independent ICC to Terminal Interface Requirements; Part III Files, Commands, and Application Selection," pp. 119-165 (May 2004).

Philips Semiconductors, "Type Identification Procedure—mifare® Card IC," Koninklijke Philips electronics N.V., Product Specification, pp. 5-24 (2002).

Communication of European publication number and information on the application of Article 67(3) EPC for European application No. 08768281.1 (Feb. 10, 2010).

\* cited by examiner

METHODS, SYSTEMS AND COMPUTER PROGRAM PRODUCTS FOR INTERACTING WITH ISO 14443-4 AND MIFARE® APPLICATIONS ON THE SAME WIRELESS SMART DEVICE DURING A COMMON TRANSACTION

TECHNICAL FIELD

The subject matter described herein relates to interacting with a wireless smart device. More particularly, the subject matter described herein relates to methods, systems, and computer program products for interacting with ISO 14443-4 and MIFARE® applications on the same wireless smart device during a common transaction.

BACKGROUND

With the success and widespread prevalence of credit and debit cards used for banking transactions, banks and financial institutions have begun to use wireless smart devices in order to provide customers with a more powerful set of features than those offered by traditional magnetic stripe ("magstripe") credit cards.

As used herein, the term "wireless smart device" refers to a device with processing capabilities capable of communicating via an electromagnetic field between the device and some other entity, usually a wireless terminal or reader. Wireless smart devices may include programmable on-board memory for storing one or more applications for performing various functions. For example, a proximity integrated circuit card (PICC) may communicate wirelessly with a proximity coupling device (PCD) to perform banking transactions similar to those performed by a traditional magstripe credit card. PICCs typically may include one or more MIFARE® applications, one or more ISO 14443-4 applications, or both. As will be explained in more detail below, MIFARE® and ISO 14443-4 are standards that define protocols for applications on wireless smart devices.

PICCs may communicate with PCDs using a wireless communications technology, such as Near Field Communication (NFC). For example, a wireless smart device, such as a mobile phone with a built-in PICC capable of Near Field Communication with a PCD (hereinafter referred to as a "NFC phone"), may communicate with a reader via inductive coupling of the reader antenna to the device antenna. The wireless reader modulates the loading on its antenna in order to amplitude-modulate a radio frequency (RF) field. The modulations in the RF field are received by an antenna located on the wireless smart device, thereby communicating information. The wireless smart device communicates with the reader in a similar way by modulating the loading on its antenna. An example of near-field wireless communications standard commonly used by wireless smart devices is ISO 14443. The International Organization for Standardization/International Electrotechnical Commission (ISO/IEC) 14443 specification (hereinafter referred to as the "ISO 14443") defines a communications protocol for wireless smart devices operating at 13.56 MHz in close proximity with a reader antenna. ISO 14443 consists of four parts, hereinafter referred to as 14443-1, 14443-2, 14443-3, and 14443-4. ISO 14443-1 and 14443-2 define the physical characteristics of PICCs and the methods for wireless power and data transfer between PCDs and PICCS. ISO 14443-3 defines initialization and anti-collision protocols for PICCs and PCDs. Finally, ISO 14443-4 defines the high-level data transmission protocols used by PICCs and PCDs.

As used herein, the term "layer 4 application" refers to an application stored on a wireless smart device, such as a PICC, that complies with the ISO 14443-4 specification. An exemplary layer 4 application includes a credit card payment application, such as a MasterCard™ or Visa™ contactless payment application. Unlike magstripe cards, which are read-only devices that simply report account information to the magstripe card reader, wireless smart devices may perform functions, such as encryption/decryption of data, authentication, authorization, and verification of the user or of the user's transaction, storage and/or validation of the card-holder's identification. Examples of wireless smart devices that may include layer 4 applications include mobile phones, smart phones, key fobs, physical cards, and personal digital assistants with interfaces to local card readers.

As used herein, the term "MIFARE® application" refers to an application stored on a wireless smart device that complies with the MIFARE® specification. The MIFARE® wireless smart card standard is a proprietary technology based on the ISO 14443 Type A specification. A first category of MIFARE® products includes MIFARE® Classic and MIFARE® UltraLight which support ISO 14443-1, 14443-2, and 14443-3, but replace ISO 14443-4 with MIFARE® proprietary protocol. Additionally, MIFARE® Classic products support a proprietary security protocol for authentication. A second category of MIFARE® products includes MIFARE® ProX and MIFARE® SmartMX wireless smart devices and readers that supports all four parts of ISO 14443 and can also support MIFARE® proprietary protocol. MIFARE® applications may include, for example, electronic coupons or customer loyalty cards.

One problem associated with conventional wireless smart device readers is an inability to interact with both MIFARE® and ISO 14443-4 applications located on the same wireless smart device during a common transaction, such as a payment transaction. For example, a conventional wireless reader may detect a wireless smart device that supports both ISO 14443-4 and MIFARE® applications. In response to receiving information from the wireless smart device, the reader determines whether the device supports ISO 14443-4. If so, an ISO 14443-4 transaction is attempted. If the transaction is terminated for any reason, the reader cannot attempt to perform a MIFARE® transaction. No standard defines how the reader should prioritize a combination of multiple ISO 14443-4 and MIFARE® applications.

In a typical transaction, a wireless smart device including both ISO 14443-4 and MIFARE® applications may be presented to a wireless reader. The reader may then determine that the smart device supports ISO 14443-4 and attempt to perform an ISO 14443-4 transaction. However, because the user of the smart device does not wish to perform an ISO 14443-4 transaction, the transaction is terminated. However, the user is not able to perform the desired MIFARE® transaction in this case because the conventional wireless smart device reader is incapable of determining whether the wireless smart device supports MIFARE® and subsequently transitioning from an ISO 14443-4 transaction to a MIFARE® transaction. Moreover, in addition to placing limitations on the type of transactions that may be performed as a result of a terminated ISO 14443-4 transaction, conventional wireless readers are also incapable of transitioning from successfully interacting with an ISO 14443-4 application to initiating a MIFARE® application during a common transaction.

Accordingly, in light of the problems with current wireless smart device readers, there exists a need for improved methods, systems, and computer program products for supporting ISO 14443-4 and MIFARE® applications on the same wireless smart device during a common transaction.

SUMMARY

Methods, systems, and computer program products for interacting with ISO 14443-4 and MIFARE® applications on the same wireless smart device during a common transaction are disclosed. According to one aspect, the method includes detecting and communicating with an ISO 14443-4 application located on a wireless smart device that includes an ISO 14443-4 and a MIFARE® application to perform at least part of the common transaction. Termination of the ISO 14443-4 application is detected, and the MIFARE® application located on the wireless smart device is detected and communicated with for performing at least part of the common transaction.

According to another aspect, a wireless smart device reader for interacting with ISO 14443-4 and MIFARE® applications on the same wireless smart device during a common transaction is provided. The wireless smart device reader includes a MIFARE® transaction module, an ISO 14443-4 module, and a transaction type identification module. The MIFARE® transaction module is configured to communicate with a MIFARE® application on a wireless smart device including both an ISO 14443-4 and a MIFARE® application. The ISO 14443-4 transaction module is configured to communicate with an ISO 14443-4 application on the wireless smart device. The transaction type identification module is configured to detect and communicate with the MIFARE® and ISO 14443-4 applications on the wireless smart device and detect termination of the ISO 14443-4 application during the transaction.

In one exemplary implementation, the subject matter described herein may be implemented in a computer program product comprising computer executable instructions embodied in a computer readable medium for performing steps.

BRIEF DESCRIPTION OF THE DRAWINGS

The subject matter described herein will now be explained with reference to the accompanying drawings of which.

DETAILED DESCRIPTION

Figure 1:
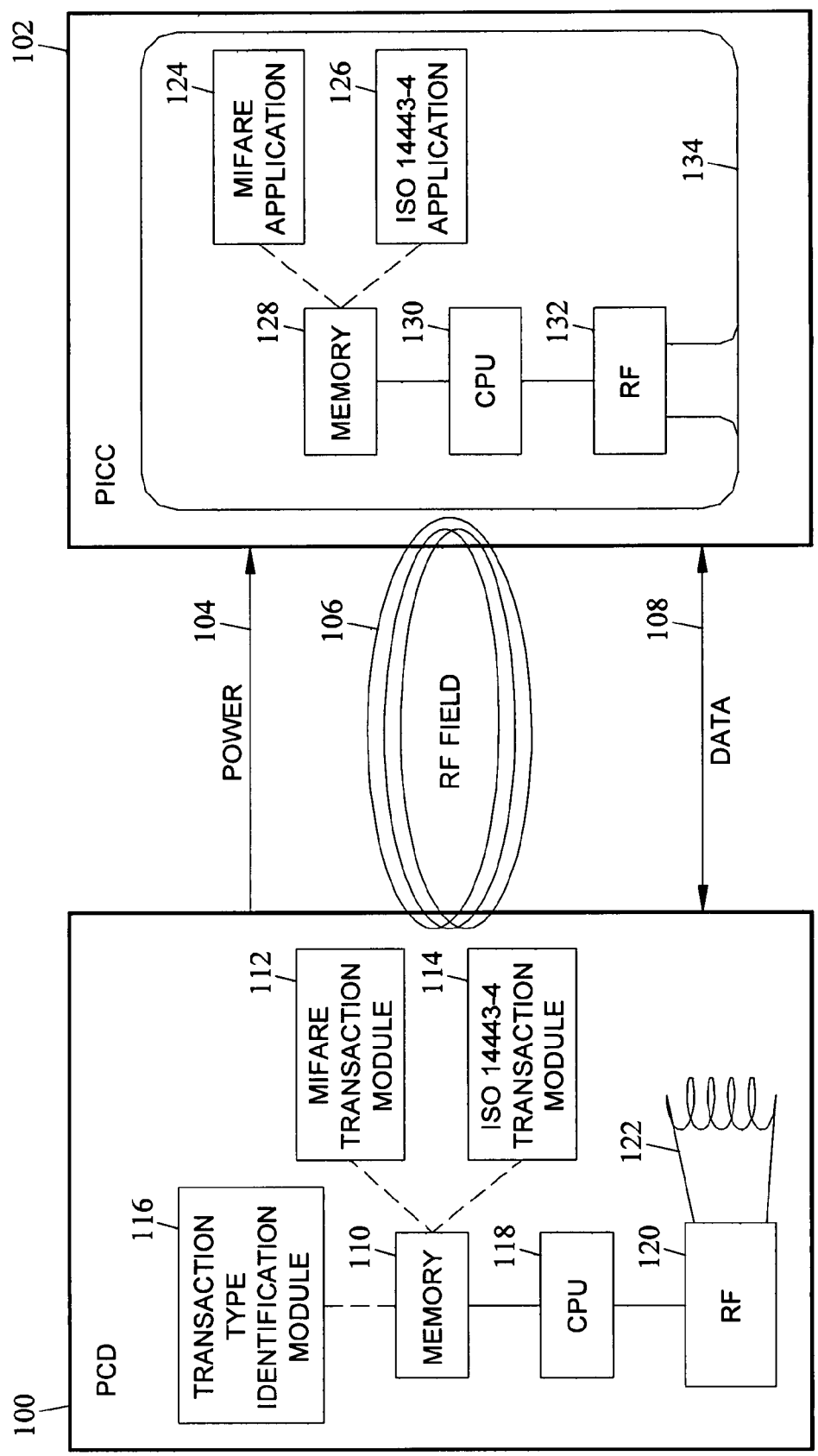
FIG. 1 is a block diagram of an exemplary system including a wireless smart device supporting ISO 14443-4 and MIFARE® applications and a wireless smart device reader for interacting with ISO 14443-4 and MIFARE® applications on the same wireless smart device during a common transaction according to an embodiment of the subject matter described herein.

FIG. 1 is a block diagram of an exemplary system including a wireless smart device reader and a wireless smart device for interacting with ISO 14443-4 and MIFARE® applications on the same wireless smart device during a common transaction according to an embodiment of the subject matter described herein. In FIG. 1, a wireless smart device reader comprises a proximity coupling device (PCD) 100, and a wireless smart device comprises a proximity integrated circuit card (PICC) 102. PCD 100 transfers power 104 to PICC 102 via RF electromagnetic field 106. PCD 100 and PICC 102 bi-directionally exchange data 108 via field 106.

In FIG. 1, PCD 100 may include memory for storing software programs and other information used for performing wireless transactions with PICC 102. For example, memory 110 may include a MIFARE® transaction module 112, an ISO 14443-4 transaction module 114, and a transaction type identification module 116. MIFARE® transaction module 112 may include instructions for reading and/or writing data to MIFARE® memory. Module 112 may include a proprietary command set and security algorithm for performing MIFARE® transactions as part of a common transaction. As used herein, the term common transaction may include the process of a user presenting a wireless smart device to a wireless smart device reader and communicating with an ISO 14443-4 application and a MIFARE® application without requiring the user to re-present the wireless smart device to the wireless smart device reader. For example, a user may perform a common transaction by presenting PICC 102 to PCD 100 and performing an ISO 14443-4 and/or a MIFARE® transaction without re-presenting PICC 102 separately for each transaction.

Similarly, ISO 14443-4 transaction module 114 may include instructions for performing a layer 4 transaction. In an ISO 14443-4 transaction, PCD 100 communicates with an application located on PICC 102 through one or more application protocol data unit (APDU) commands. The APDU messaging protocol is defined in ISO 7816 and includes multiple command sets, where each layer 4 application may support a different APDU command set.

Transaction type identification module 116 may include instructions for determining whether to perform a MIFARE® or an ISO 14443-4 transaction based on information received from the wireless smart device. For example, module 116 may perform a MIFARE® transaction after receiving information from PICC 102 indicating that PICC 102 does not support ISO 14443-4. In another example, module 116 may initiate both an ISO 14443-4 transaction and a MIFARE® transaction if PICC 102 supports both standards in addition to other factors. The details of transaction type identification module 116 will be described in greater detail below.

PCD 100 may include a processor for executing instructions stored in memory 110 and other various tasks. For example, central processing unit (CPU) 118 may communicate with modules 112-116 in order to perform a MIFARE® and/or an ISO 14443-4 transaction. Additionally, CPU 118 may communicate with RF control module 120 to transmit and receive data 108 with PICC 102. For example, RF module 120 may be configured to modulate the amplitude of RF field 106 by modulating the load on antenna 122, thereby transmitting and receiving data 108 with PICC 102.

Similarly, PICC 102 may include a memory, processor, RF module and antenna in order to execute applications and communicate with PCD 100. For example, PICC 102 may include MIFARE® application 124 and ISO 14443-4 application 126 located in memory 128 for performing MIFARE® and ISO 14443-4 transactions, respectively. CPU 130 may be connected to memory 128 and execute instructions for applications, such as MIFARE® application 124 and ISO 14443-4 application 126. CPU 130 may also communicate with RF module 132 for modulating the load on antenna 134 for transmitting and receiving data 108 with PCD 100.

Memory 128 may be an electronically erasable programmable read only memory (EEPROM) or a read only memory (ROM) 118 or other suitable type of memory. Antenna 134 may be a loop antenna as illustrated in FIG. 1. However, it is appreciated that other configurations of PICC 102 and its components may be implemented without departing from the scope of the subject matter described herein.

MIFARE® application 124 may be any suitable type of MIFARE® application. For example, MIFARE® application 124 may implement various tokens such as coupons, customer loyalty cards, promotions, and access tickets. In one specific example, a MIFARE® application 124 may implement a customer loyalty card (i.e. a customer identification token) that tracks information associated with customer purchases in exchange for various discounts either in MIFARE® applications or in online applications connected through point of sale terminals. In one implementation, a customer may use a grocery store card that tracks groceries purchased by the user, the time that the groceries are purchased, and the amount spent on groceries per month. This information may be used by the grocery store for marketing, distribution analysis, or other purposes. In exchange, the customer may receive discounts on commonly purchased groceries.

In another example, MIFARE® application 124 may implement a customer loyalty card that tracks purchases and generates a discount only after a certain number of purchases are made rather than for all purchases. In this case, a counter may be stored on the user's wireless smart device in order to track the user's progress toward the threshold goal or the user's purchase details may be stored in an online bucket and the discount may be automatically applied once the threshold is reached. In an online bucket embodiment, information associated with each transaction may be sent from a point of sale terminal to an online application for real time processing. In one implementation, a customer may use a sandwich club card that increments a counter for each sandwich the customer purchases and entitles the customer to a free sandwich after 10 purchases. Thus, the discount is received only after multiple purchases by the user.

In another example, MIFARE® application 124 may implement a simple coupon that entitles the customer to a discount on the purchase of a single item. In this case, information is not tracked over time relating to a particular customer, nor are multiple purchases required in order to receive the discount. Rather, the coupon is used to alter the amount owed by the user at the time of purchase. In one embodiment, a coupon for 35 cents off of cat food is used by a customer to reduce the price of purchased cat food from 75 cents to 40 cents.

In yet another example, the MIFARE® application may include a ticket that controls access to a location. This example may share one or more of the attributes described in the examples above, such as incrementing or decrementing a value stored on the card or exchanging ticket information with an access control gateway for online or offline validation. In one implementation, a user may purchase 3 movie tickets or 3 train tickets that provide the user with access to a movie or a train. A value stored on the card may be decremented each time a ticket is used, and information relating to the transaction may be tracked. In this case, no discount is necessarily received by the user and no goods are necessarily purchased. Rather, use of the wireless smart card may be viewed as a redemption, by the user, of a pre-paid service.

ISO 14443-4 application 126 may be any suitable type of ISO 14443-4 application. For example, ISO 14443-4 application 126 may include various types of payment systems, such as debit cards and credit cards associated with various banking and/or credit institutions. In one specific example, ISO 14443-4 application 126 may implement a Visa™ credit payment system. ISO 14443-4 application 126 may include, for example, similar payment information to that located on a conventional magstripe credit card, such as an account number, an expiration date, and an account holder name. In one exemplary scenario, a wireless smart device including ISO 14443-4 application 126 as described above may be presented to a wireless smart device reader in order to complete a payment portion of a common transaction, where it is appreciated that common transaction may include interacting with other applications on the same wireless smart device.

Figure 2:
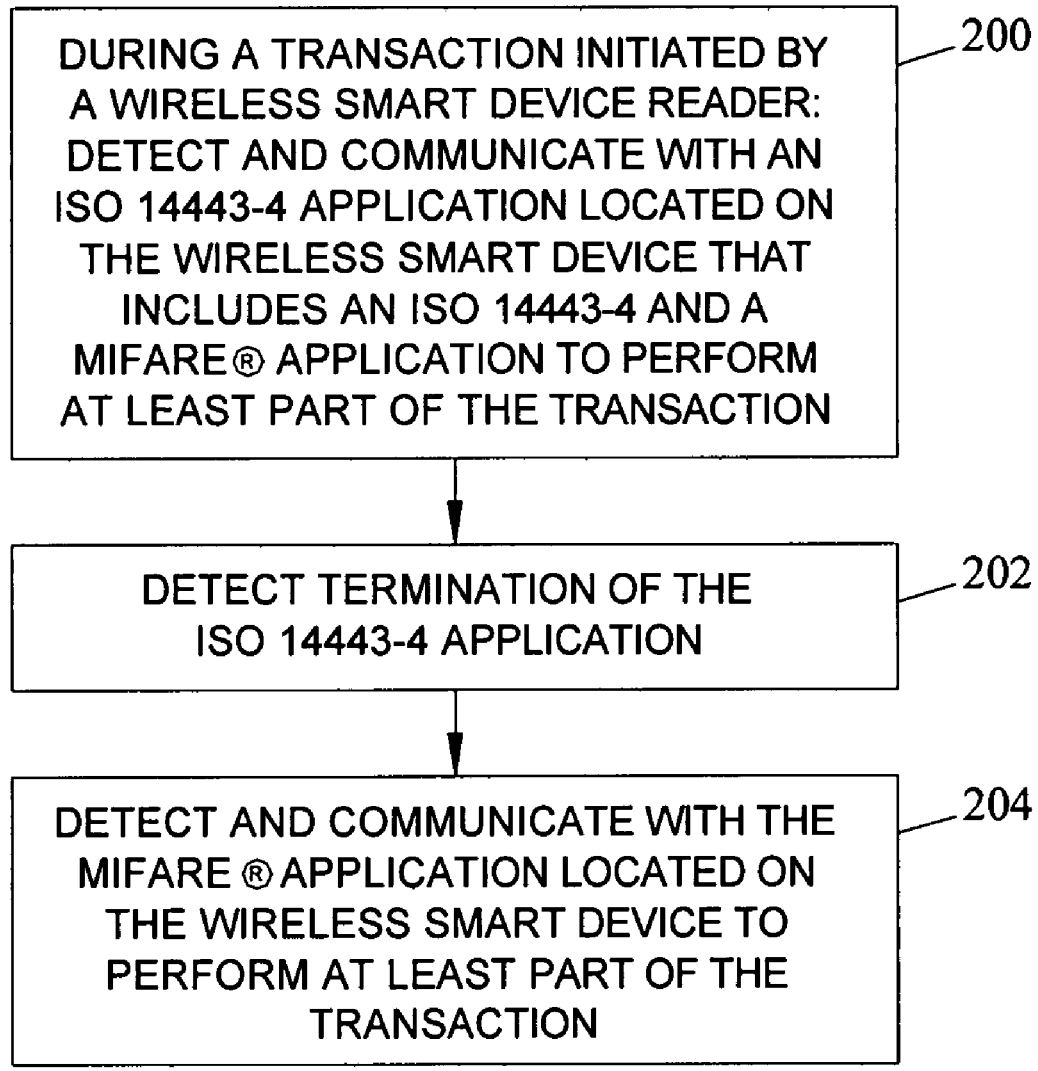
FIG. 2 is a flow chart of an exemplary process for interacting with ISO 14443-4 and MIFARE® applications on the same wireless smart device during a common transaction according to an embodiment of the subject matter described herein.

FIG. 2 is a flow chart of an exemplary process for interacting with ISO 14443-4 and MIFARE® applications on the same wireless smart device during a common transaction according to an embodiment of the subject matter described herein. Referring to FIG. 2, in block 200, an ISO 14443-4 application located on a wireless smart device including both an ISO 14443-4 and a MIFARE® application is detected and begins communicating with a wireless smart device reader, such as PCD 100, for performing at least part of a common transaction. For example, upon entering RF field 106, PICC 102 may receive power 104 begin communication initialization and anti-collision procedures as defined by ISO 14443-1, 14443-2, and 14443-3.

After PCD 100 has detected and completed initial communications with PICC 102, PCD 100 may communicate with PICC 102 by transmitting a Select command, to which PICC 102 may respond by transmitting a Select Acknowledge (SAK). As defined in ISO 14443, SAK contains information indicating various attributes of PICC 102. Table 1 shown below illustrates an exemplary coding of SAK for PICC 102.

TABLE 1

Exemplary SAK coding

| b8 | b7 | b6 | b5 | b4 | b3 | b2 | b1 | Meaning |
|---|---|---|---|---|---|---|---|---|
| x | x | 1 | x | x | x | x | x | PICC supports ISO 14443-4 |
| x | x | 0 | x | x | x | x | x | PICC does not support ISO 14443-4 |
| x | x | x | x | 1 | x | x | x | PICC supports MIFARE ® |
| x | x | x | x | 0 | x | x | x | PICC does not support MIFARE ® |

Referring to Table 1 illustrated above, bit 6 of SAK indicates whether or not PICC 102 supports ISO 14443 layer 4. If bit 6 equals 1, PICC 102 is ISO 14443-4 compliant and, conversely, if bit 6 equals 0, PICC 102 is not ISO 14443-4 compliant. For example, a wireless smart device that can support ISO 14443-4 applications will return a SAK including bit 6 equal to 1 in response to a Select command received from a wireless smart device reader. Alternatively, a wireless smart device that does not support ISO 14443-4 applications will return a SAK including bit 6 equal to 0 in response to a Select command received from a wireless smart device reader.

Bit 4 of SAK indicates whether or not a wireless smart device supports MIFARE®. PICC 102 may indicate support for MIFARE® by generating a SAK including bit 4 equal to 1 in response to receiving a Select command from a wireless smart device reader. For example, if PICC 102 is MIFARE®-compliant, PICC 102 may generate SAK including bit 6 equal to 1 in response to a Select command received from PCD 100.

Exemplary ISO 14443-4 compliant wireless smart devices may include, but are not limited to, a Near Field Communication (NFC) mobile telephone, a smart phone, a key fob, a physical card, a personal digital assistant, debit card, credit card, and a device provisioned with a soft card. Exemplary layer 4 applications that may be located on an ISO 14443-4-compliant wireless smart device may include a payment application, such as a Visa™ or Mastercard™ contactless payment application. Exemplary MIFARE® applications that may be located on MIFARE®-compliant wireless smart devices may include coupons, tickets, and customer loyalty cards.

In block 202, the termination of the ISO 14443-4 application is detected. For example, PCD 100 may extract the value of bits 4 and 6 of SAK transmitted by PICC 102 in response to a Select command. Based on the values of bits 4 and 6 of SAK, PCD 100 may initially attempt to perform an ISO 14443-4 transaction and may subsequently transition to detecting and communicating with a MIFARE® application based on several conditions which will be discussed in greater detail with respect to FIG. 3.

In block 204, the MIFARE® application located on the wireless smart device is detected and begins communicating with the wireless smart device reader for performing at least part of the common transaction. For example, PCD 100 may communicate with MIFARE® application 124 in order to attempt to complete a MIFARE® portion of a transaction. Therefore, subsequent to detecting termination of an ISO 14443-4 application located on the same wireless smart card as the MIFARE® application, a MIFARE® application may be detected and communicated with during the same transaction. It is appreciated that the ISO 14443-4 application may be terminated, for example, after successful completion of an ISO 14443-4 transaction, failure of an attempted ISO 14443-4 transaction, or additional errors that will be discussed in greater detail below.

Figure 3A:
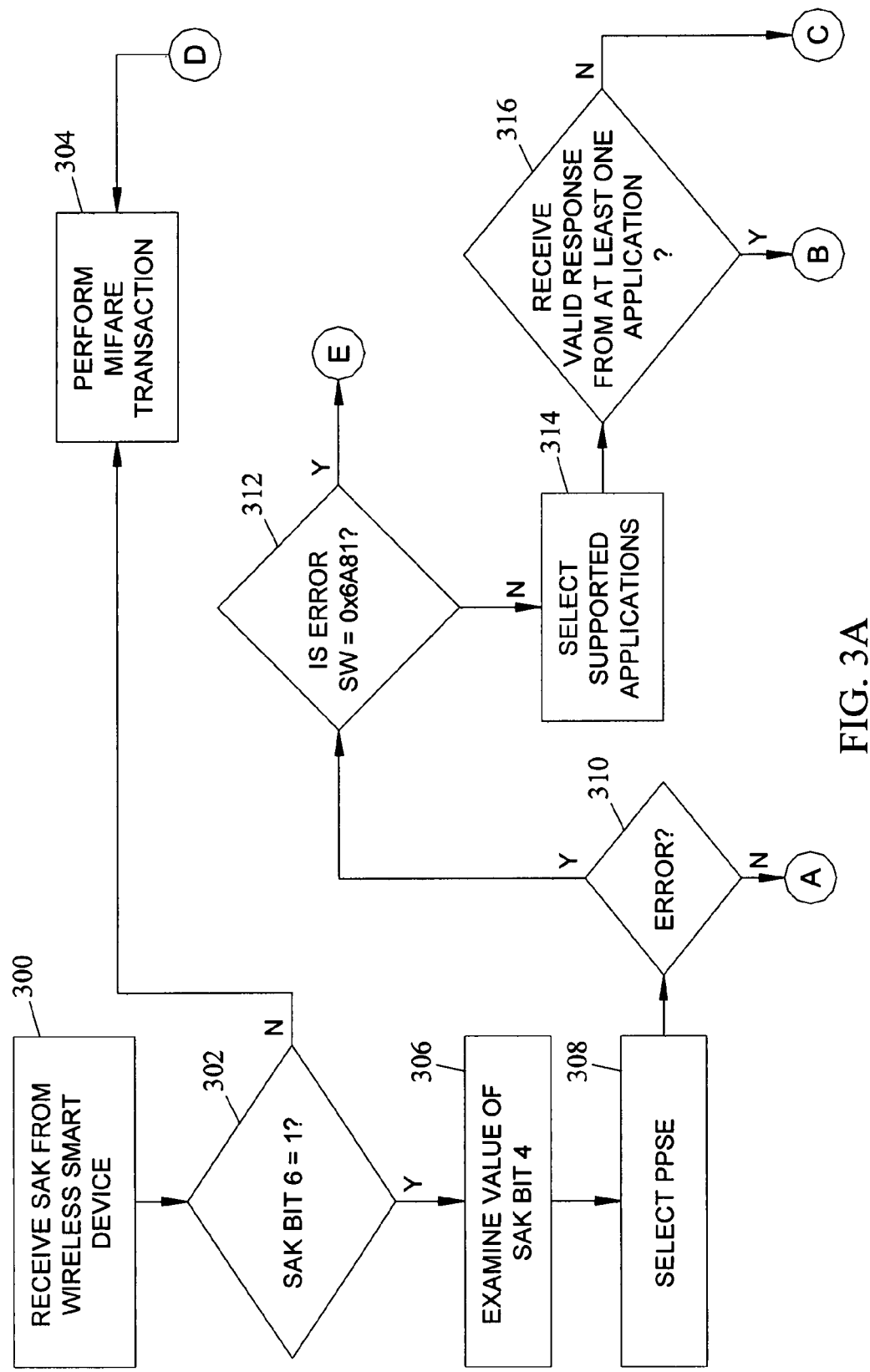
FIGS. 3A and 3B are a detailed flow chart of an exemplary process for interacting with ISO 14443-4 and MIFARE® applications on the same wireless smart device during a common transaction according to an embodiment of the subject matter described herein.
Figure 3B:
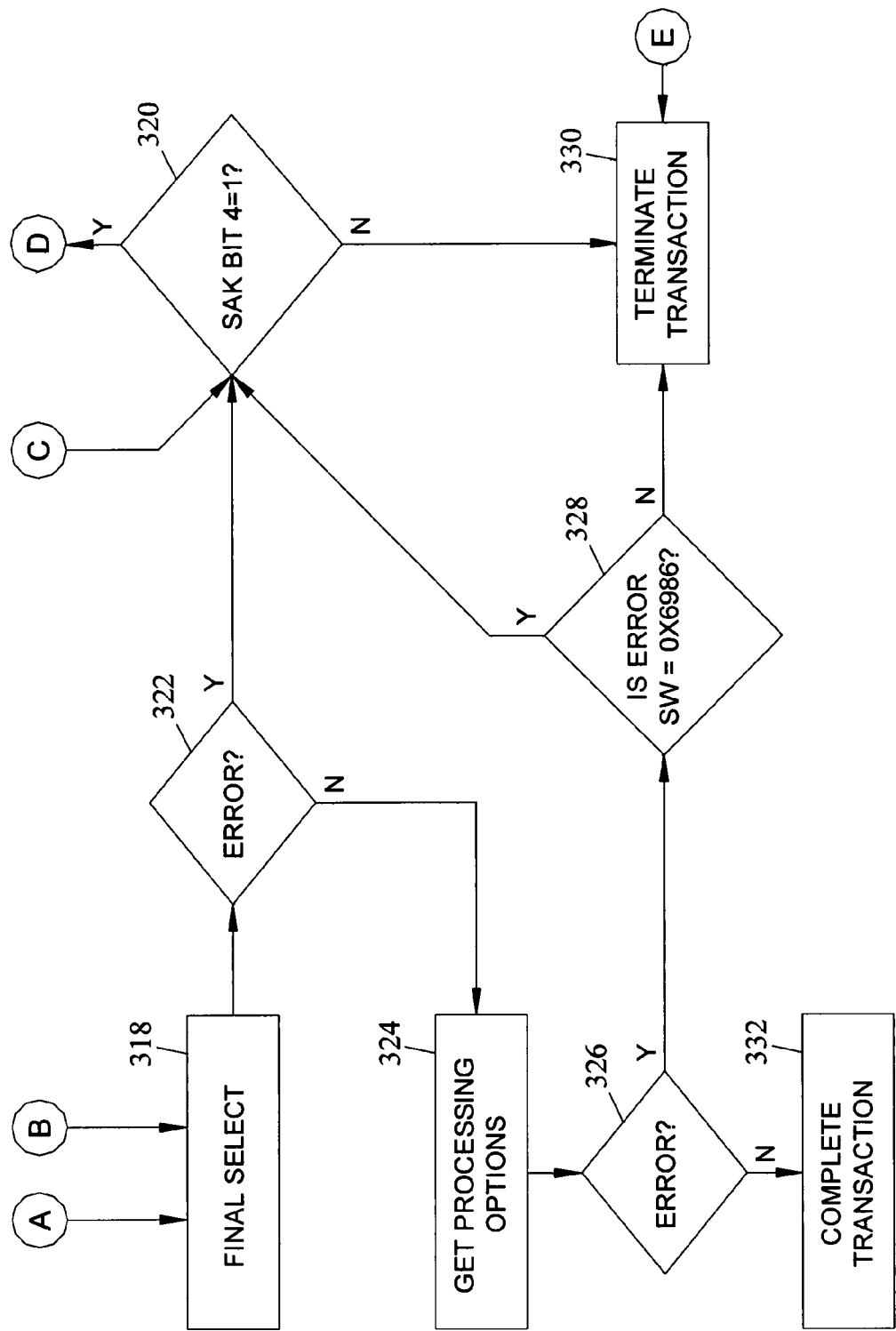

FIG. 3 is a detailed flow chart of an exemplary process for supporting ISO 14443-4 and MIFARE® applications on a wireless smart device according to an embodiment of the subject matter described herein. Referring to FIG. 3, in block 300, a SAK is received from a wireless smart device. The SAK may be generated by the wireless smart device in response to receiving a Select command from a wireless reader. For example, PCD 100 may transmit a Select command to PICC 102 in order to begin communicating with PICC 102. PICC 102 may then generate a SAK in response, which is received by PCD 100.

In block 302, bit 6 of the SAK is examined in order to determine whether PICC 102 is ISO 14443-4 compliant. If bit 6 equals 0, indicating that ISO 14443-4 is not supported, a MIFARE® transaction may be performed in block 304. If, on the other hand, it is determined that bit 6 of SAK equals 1, indicating ISO 14443-4 compliance, control proceeds to block 306 where the value of bit 4 is examined.

Examination of bit 4 in block 306 may include storing the value of bit 4 in memory or setting a flag indicating the value of bit 4 allowing for a subsequent decision to be made by PCD 100 based on bit 4, as will be discussed in greater detail below. Regardless of the implementation, it is appreciated that no decision is made, at block 306, based on the value of bit 4. Rather, control proceeds immediately to block 308.

In block 308, PPSE may be selected, where it is appreciated that PPSE may include a Proximity Payment System Environment or a PayPass Payment System Environment. Selecting the PPSE on a wireless smart device is a method used by contactless applications in order to retrieve a directory listing of active applications located on the device. For example, PCD 100 may Select the file "2PAY.SYS.DDF01" located on PICC 102 and receive a PPSE response.

In the event that PPSE selection results in an error in block 308, the error is detected in block 310. In block 310, if no error is received, an ISO 14443-4 transaction may be initiated. Alternatively, if an error is received in block 310, it is determined in block 312 whether the error includes the status word (SW) 0x6A81. SW=0x26A81 indicates a special case failure (the indication is that the device is disabled) that results in immediate transaction termination without checking MIFARE® support.

If the error received in block 312 is an error other than SW=0x6A81, the wireless reader may attempt to select at least one supported application located on the wireless smart device in block 314. For example, because PCD 100 has no prior knowledge of any applications stored on PICC 102, in block 314 PCD 100 may transmit Select application identification (AID) commands to PICC 102 for each application supported by PCD 100. PCD 100 can determine from Select AID responses which applications are supported by both PCD 100 and PICC 102.

In block 316, it is determined whether a valid response is received from at least one application located on PICC 102. For example, if the result of the AID Selection method performed in block 314 is that a valid response is received, an ISO 14443-4 transaction may be initiated. Alternatively, if no valid response is received in block 316, a determination is made as to whether PICC 102 is MIFARE® compliant, and thus, a MIFARE® transaction may be performed.

If at least one valid response is received in block 316, final selection of a supported application may be performed in block 318. For example, PCD 100 may receive valid responses from multiple applications located on PICC 102 in response to its AID Selection, where each application has a priority value associated with it. In this situation, the application with the highest priority value may be selected in block 318. It is appreciated that other selection methods may also be implemented without departing from the subject matter described herein. For example, the wireless smart device or the wireless smart device reader may prompt a user to select the application the user desires to utilize.

If no valid response was received in block 316, PCD 100 may determine whether PICC 102 is MIFARE® compliant based on the value of bit 4 of the SAK in block 320. Similar to the determination made in block 302 regarding bit 6 of SAK, if it is determined that PICC 102 is MIFARE® compliant because bit 4 of SAK equals 1, a MIFARE® transaction may be performed according to block 304. Alternatively, if bit 4 equals 0, indicating that PICC 102 is not MIFARE® compliant, the transaction may be terminated in block 330.

Returning to the result of block 318 where at least one valid response was received and final select was performed, it is determined in block 322 whether an error is received during Final Select. If no error is received, an ISO 14443-4 transaction may be initiated in block 324 with the selected application. Alternatively, if an error is received during Final Select, the MIFARE® support of PICC 102 is determined and either a MIFARE® transaction is performed in block 304 or the transaction is terminated in block 330.

In block 324, an ISO 14443-4 transaction may be initiated by PCD 100 by transmitting the first transaction command. For example, PCD 100 may transmit a Get Processing Options (GPO) command to PICC 102 in block 324. If PICC 102 responds to the GPO command with an error in block 326, control proceeds to block 328 where a determination is made based on the specifics of the error. It is appreciated that the GPO command described above is just one example of a first transaction command and that other suitable transaction commands may be used for initiating a transaction without departing from the scope of the subject matter described herein.

In block 328, if the error received is SW=0x6986, control returns to block 320 where a determination is made regarding whether MIFARE® is supported. If SW=0x6986 is returned in a GPO response from an application, the indication is that the application has not been explicitly selected by the user to be used for payment. If the application has not been explicitly selected by the user, either a MIFARE® transaction may be performed if supported by PICC 102 or the transaction may be terminated. Alternatively, if the error received in block 328 does not include SW=0x6986, the transaction may be terminated in block 330 without first determining whether PICC 102 supports MIFARE®. In order to illustrate the flow chart shown in FIG. 3, an exemplary message flow diagram is provided in FIG. 4.

Figure 4:
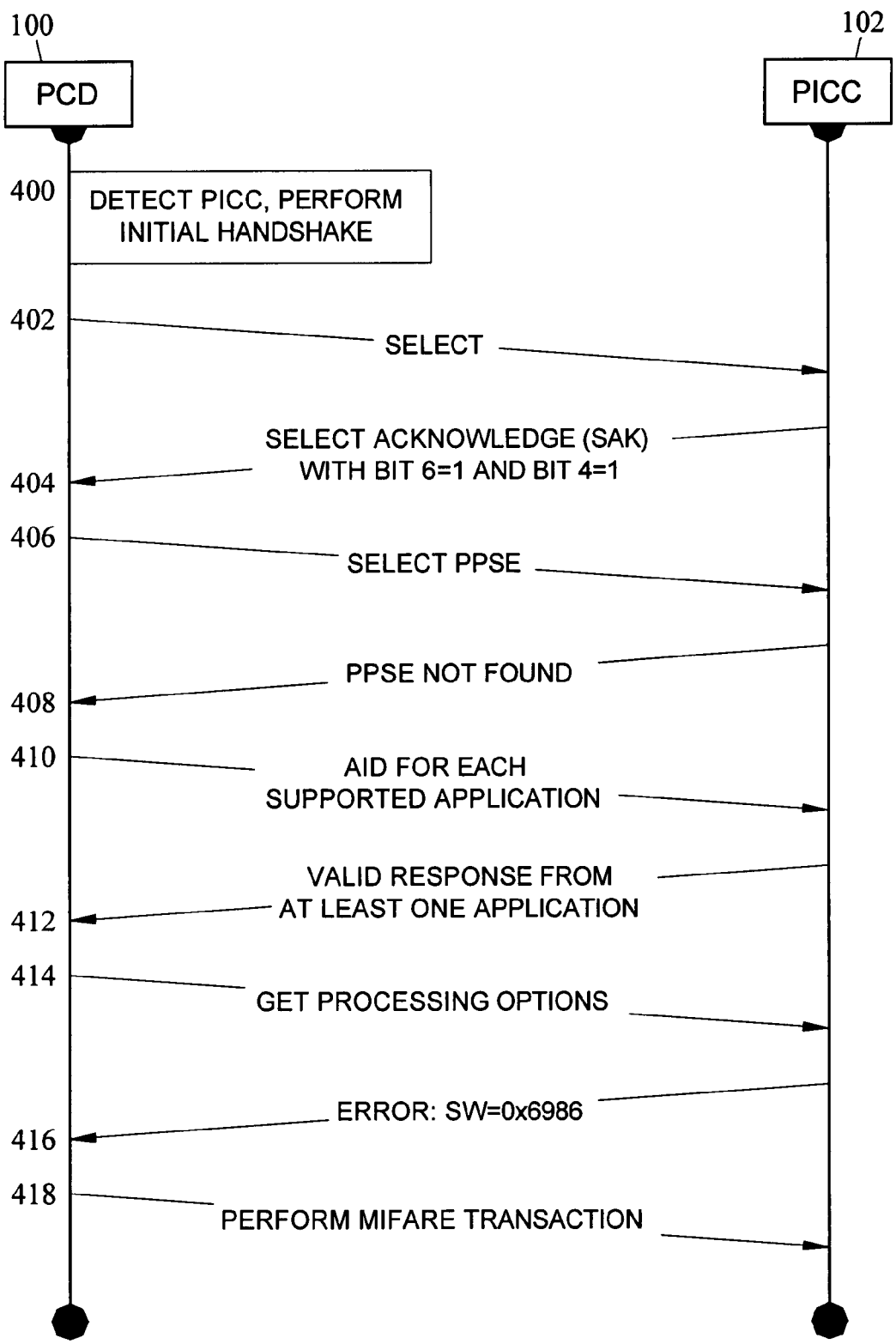
FIG. 4 is a message flow diagram illustrating exemplary communications between a PCD and a PICC for interacting with ISO 14443-4 and MIFARE® applications on the same wireless smart device during a common transaction according to an embodiment of the subject matter described herein.

FIG. 4 is a message flow diagram illustrating exemplary communications between PCD 100 and a PICC 102 for interacting with ISO 14443-4 and MIFARE® applications on the same wireless smart device during a common transaction according to an embodiment of the subject matter described herein. In the example scenario illustrated in FIG. 4, PICC 102 includes two layer 4 applications and two MIFARE® applications, and is located within the RF field of a PCD reader. In step 400, PCD 100 may detect PICC 102 and perform initial handshake procedures. For example, for Type A wireless smart cards, block 400 may include sending a Request command (REQA) and receiving an Answer to Request (ATQA) from PICC 102. It is appreciated that the steps indicated in block 400 may include various communications based on specific implementations of PCD 100 and PICC 102 without departing from the subject matter described herein.

In block 402, PCD 100 may transmit a Select command to PICC 102 indicating the beginning of communications between PCD 100 and PICC 102. In the example illustrated in FIG. 4, PICC 102 responds to the Select command by transmitting a Select Acknowledge (SAK) in step 404. In this example, it is assumed that the SAK includes bits 4 and 6 of SAK equal 1 indicating that PICC 102 supports both layer 4 and MIFARE® applications.

In block 406, PCD 100 transmits a Select PPSE command to PICC 102. In this example, PICC 102 contains no active selected application and therefore returns a "PPSE Not Found" response to PCD 100. PCD 100 then transmits an AID for each application it supports to PICC 102 in order to select a supported application that may be used to perform an ISO 14443-4 transaction.

In the scenario illustrated in FIG. 4, a valid response is received from at least one application located on PICC 102. From this list of one or more applications, a single ISO 14443-4 application is selected based on the priority values associated with each application. For example, PICC 102 may contain two layer 4 applications, such as a MasterCard™ and a Visa™ contactless payment application, where the MasterCard™ application has a higher priority value than the Visa™ application. In this example, the MasterCard™ application may be selected in block 412 based on its higher priority value.

In block 414, a layer 4 transaction is initiated by transmitting a Get Processing Options (GPO) command to PICC 102. However, in this example, PICC 102 returns an error in response to the GPO command in block 416 that includes status word 0x6986. Because this error does not result in a transaction termination according to block 328 of the flow chart illustrated in FIG. 3, support for the MIFARE® protocol is checked. Because PICC 102 contains a valid MIFARE® application, a MIFARE® transaction is performed in block 418. Thus, in FIG. 4, a MIFARE® transaction is performed after detecting the termination of an ISO 14443-4 transaction.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for interacting with ISO 14443-4 and MIFARE applications on the same wireless smart device during a common transaction, the method comprising:
during a common transaction between a wireless smart device and a wireless smart device reader, wherein the wireless smart device includes an ISO 14443-4 application and a MIFARE application, the common transaction is initiated by the wireless smart device reader, the common transaction includes a first wireless interaction associated with the ISO 14443-4 application, the common transaction includes a second wireless interaction associated with the MIFARE application, and the first wireless interaction and the second wireless interaction are part of a single continuous communications session:
as part of the first wireless interaction, detecting and communicating with the ISO 14443-4 application located on the wireless smart device to perform at least part of the common transaction;
as part of the first wireless interaction, detecting termination of the ISO 14443-4 application located on the wireless smart device; and
in response to detecting termination of the ISO 14443-4 application located on the wireless smart device, as part of the second wireless interaction, and after termination of the ISO 14443-4 application, detecting and communicating with the MIFARE application located on the wireless smart device to perform at least part of the common transaction.

2. The method of claim 1 comprising receiving a select acknowledge (SAK) from the wireless smart device.

3. The method of claim 2 wherein detecting an ISO 14443-4 application includes examining the value of bit 6 of the SAK and, based on the value, determining the presence of the ISO 14443-4 application.

4. The method of claim 2 wherein detecting a MIFARE application includes examining the value of bit 4 of the SAK and, based on the value, determining the presence of the MIFARE application.

5. The method of claim 1 wherein the transaction comprises at least one of a payment transaction and a loyalty transaction.

6. The method of claim 1 wherein the wireless smart device comprises a device selected from the group consisting of a Near Field Communication (NFC) mobile telephone, a smart phone, a key fob, a physical card, a personal digital assistant, debit card, credit card, and a device provisioned with a soft card.

7. The method of claim 1 wherein detecting termination of the ISO 14443-4 application includes detecting a user-initiated termination of the ISO 14443-4 application.

8. The method of claim 1 wherein detecting termination of the ISO 14443-4 application includes detecting a termination of the ISO 14443-4 application in response to completion of an ISO 14443-4 transaction portion.

9. A wireless smart device reader for interacting with ISO 14443-4 and MIFARE applications on the same wireless smart device during a common transaction, the wireless smart device reader comprising:
- an ISO 14443-4 transaction module for, as part of a first wireless interaction, detecting and communicating with an ISO 14443-4 application located on a wireless smart device to perform at least part of a common transaction, wherein the wireless smart device includes the ISO 14443-4 application and a MIFARE application;
- a MIFARE transaction module for, in response to detecting termination of the ISO 14443-4 application located on the wireless smart device, as part of a second wireless interaction, and after termination of the ISO 14443-4 application, detecting and communicating with the MIFARE application located on the wireless smart device to perform at least part of the common transaction; and
- a transaction type identification module for detecting and communicating with the ISO 14443-4 and MIFARE applications and for as part of the first wireless interaction, detecting termination of the ISO 14443-4 application located on the wireless smart device, wherein the common transaction is initiated by the wireless smart device reader, the common transaction includes the first wireless interaction associated with the ISO 14443-4 application, the common transaction includes the second wireless interaction associated with the MIFARE application, and the first wireless interaction and the second wireless interaction are part of a single continuous communication session.

10. The reader of claim 9 wherein the transaction type identification module is configured to receive a select acknowledge (SAK) from the wireless smart device.

11. The reader of claim 10 wherein the transaction type identification module is configured to perform a MIFARE transaction based at least on the value of bit 4 of the SAK.

12. The reader of claim 10 wherein the transaction type identification module is configured to perform an ISO 14443-4 transaction based at least on the value of bit 6 of the SAK.

13. The reader of claim 9 wherein the transaction comprises at least one of a payment transaction and a loyalty transaction.

14. The reader of claim 9 wherein the transaction type identification module is configured to receive information from a wireless smart device located on a device selected from a group consisting of a Near Field Communication (NFC) mobile telephone, a smart phone, a key fob, a physical card, a personal digital assistant, debit card, credit card, and a device provisioned with a soft card.

15. The reader of claim 9 wherein the transaction type identification module is configured to receive one or more status words.

16. The reader of claim 9 wherein the transaction type identification module is configured to detect a user-initiated termination of the ISO 14443-4 application.

17. The reader of claim 9 wherein the transaction type identification module is configured to detect a termination of the ISO 14443-4 application in response to completion of an ISO 14443-4 transaction portion.

18. A non-transitory computer readable medium having stored thereon computer executable instructions that, when executed by a processor of a computer, perform steps comprising:
- during a common transaction between a wireless smart device and a wireless smart device reader, wherein the wireless smart device includes an ISO 14443-4 application and a MIFARE application, the common transaction is initiated by the wireless smart device reader, the common transaction includes a first wireless interaction associated with the ISO 14443-4 application, the common transaction includes a second wireless interaction associated with the MIFARE application, and the first wireless interaction and the second wireless interaction are part of a single continuous communications session:
- as part of the first wireless interaction, detecting and communicating with the ISO 14443-4 application located on the wireless smart device to perform at least part of the common transaction;
- as part of the first wireless interaction, detecting termination of the ISO 14443-4 application located on the wireless smart device; and
- in response to detecting termination of the ISO 14443-4 application located on the wireless smart device, as part of the second wireless interaction, and after termination of the ISO 14443-4 application, detecting and communicating with the MIFARE application located on the wireless smart device to perform at least part of the common transaction.

* * * * *